(12) United States Patent
Littleford

(10) Patent No.: US 12,429,369 B2
(45) Date of Patent: Sep. 30, 2025

(54) FLUID DETECTION

(71) Applicant: Welldata (Subsurface Surveillance Systems) Limited, Fife (GB)

(72) Inventor: Sydney Joseph Littleford, Fife (GB)

(73) Assignee: Welldata (Subsurface Surveillance Systems) Limited, Fife (GB)

( * ) Notice: Subject to any disclaimer, the term of this patent is extended or adjusted under 35 U.S.C. 154(b) by 434 days.

(21) Appl. No.: 17/713,665

(22) Filed: Apr. 5, 2022

(65) Prior Publication Data

US 2022/0333969 A1 Oct. 20, 2022

(30) Foreign Application Priority Data

Apr. 14, 2021 (GB) ...................................... 2105290

(51) Int. Cl.
| | |
|---|---|
| *G01F 23/284* | (2006.01) |
| *E21B 47/047* | (2012.01) |
| *E21B 47/13* | (2012.01) |
| *G01S 13/88* | (2006.01) |
| *H01Q 1/22* | (2006.01) |
| *H04B 5/28* | (2024.01) |

(52) U.S. Cl.
CPC .......... *G01F 23/284* (2013.01); *E21B 47/047* (2020.05); *E21B 47/13* (2020.05); *G01S 13/88* (2013.01); *H01Q 1/225* (2013.01); *H04B 5/28* (2024.01)

(58) Field of Classification Search
CPC ...... E21B 47/047; E21B 47/13; G01F 23/284; H04B 5/28; H01Q 1/225; G01S 13/88; G01V 3/00
See application file for complete search history.

(56) References Cited

U.S. PATENT DOCUMENTS

2013/0261977 A1  10/2013  Shanks

FOREIGN PATENT DOCUMENTS

| EP | 2770306 A1 | 8/2014 |
| EP | 3719536 A1 | 10/2020 |
| GB | 2570957 A | 8/2019 |
| WO | 2013149308 A1 | 10/2013 |
| WO | 2017096489 A1 | 6/2017 |

OTHER PUBLICATIONS

"Patents Act 1977: Combined Search and Examination Report under Sections 17 and 18(3)", GB Application No. 2105290.7, Jan. 6, 2022, 13 pp.

*Primary Examiner* — Kristyn A Hall
(74) *Attorney, Agent, or Firm* — Myers Bigel, P.A.

(57) ABSTRACT

A material level detection device for detecting a material level includes a cable or transmission line having a coaxial cable and an electromagnetic transmitter and receiver arrangement connected or connectable to the cable or transmission line. The cable or transmission line acts as an antenna and includes an inner conductor and an outer conductor having a plurality of apertures or slots provided in a spaced relation along at least part of a length of the outer conductor. The inner conductor is provided within the outer conductor. The cable or transmission line is configured as a radiating cable and/or a leaky feeder, or leaky cable or hybrid of a leaky cable with a standard/nonleaky cable. The transmitter and receiver arrangement is connected or connectable to the inner conductor.

20 Claims, 16 Drawing Sheets

End Termination and Load provided End Reflection

Typical RC/LF to standard Coax connection.

Cable Construction

- Polyethylene Jacket
- Copper foil outer conductor
- Foamed PE dielectric
- Hollow copper inner conductor
- Loss 0.16dB/m Slotted outer metallic sheath Microwave leakage through slots.

Typical monitoring technique using in-well instrumentation. (Aquifer Well)

Aquifer Monitoring Well without Monitoring Instrumentation.

Metallic ring/banding strap.

Non metallic centralizer installed on RC.

FLUID DETECTION

CROSS-REFERENCE TO RELATED APPLICATION

The present application claims priority to United Kingdom Application No. 2105290.7, filed Apr. 14, 2021, the entire content of which is incorporated by reference as if set forth fully herein.

FIELD OF INVENTION

The present invention relates to detection, monitoring and/or measurement, e.g., detection, monitoring and/or measurement downhole and/or within a space such as an elongate and/or enclosed structure, well or hole, or within a container or vessel, or sealed or unsealed elongate/enclosed structure.

In particular, though not exclusively, the present invention relates to a device, apparatus and/or method for detection, monitoring and/or measurement or for detecting and/or measuring a feature or features or variable or variables or characteristic or characteristics, for example, a fluid(s) or liquid(s).

BACKGROUND TO INVENTION

The invention may find utility in, for example, an aquifer, oil or gas well, for example, a land, subsea or offshore well, for example, for production, injection, monitoring or disposal purposes. The invention may, for example, find use in detecting one or more fluid interfaces such as in a completed oil, gas or water well and/or monitoring and/or measuring a rate of change of measured depth of fluid/fluid or fluid/gas interface(s).

The present invention particularly, though not exclusively, relates to a method, apparatus and system for subsurface microwave (MW) and/or radio frequency (RF) detection and measurement which may utilize Frequency Domain Reflectometry (FDR) and other microwave measurement systems such as Frequency Modulated Continuous Wave (FMCVV), Time Domain Reflectometry (TDR), and by utilizing the principals of MW and RF reflectometry.

The present invention particularly, though not exclusively, relates to a method, apparatus and system that utilizes a gas and/or fluid filled container or vessel as a measurement instrument that utilizes the geometry, impendence, permittivity, and pressure and temperature of such a vessel and contained liquids and/or gasses to provide measurement data such as inter alia distance and pressure, for example.

The present invention particularly, though not exclusively, relates to a method, that can obtain subsurface interface data, such as gas/liquid and/or liquid/liquid interfaces, without deploying any in-well instrumentation, such as downhole gauges, wireline, or optical fibre, into the wellbores.

It is often desirable to measure a level of one or more fluids within a completed aquifer, oil, gas and/or water well. The term "completed" is typically understood in the art to refer to a well which has been drilled, (cased) and which may be sealed and/or capable of production, observation, injection, e.g., for "artificial lift", or monitoring. For example, it is often desirable to measure the level or content interface of oil, water and/or gas in such wells. This may be important when controlling flow rates from the hydrocarbon liquid, gas or water bearing formations within the well structure when seeking to maximize the efficiency of production and to monitor for changes to fluid interfaces that indicate changing well parameters such as pressure and temperature. These changes will/can be indicative of reservoir performance decline, reservoir communication, and other such subsurface indications and events. The present invention can be deployed within the tubing, the main flow conduit, or in an annular void.

Fluid level monitoring or surveillance may be required to meet regulatory reporting requirements and/or licensing agreements as required for aquifer, oil and gas data monitoring operations.

It is known to use Time and Frequency Domain Reflectometry techniques for detecting a fluid level in a vessel or structure in which an electromagnetic pulse is radiated from a transmitter to an interface between two fluids and a reflection of the electromagnetic pulse from the interface is detected at a receiver. The fluid level detection criteria requires that very short distances of, e.g., 1 to 2 mm to lengths of, e.g., 2 kms, but not limited thereto, need to be covered. The interface reflection is generally a resultant of the differential of dielectric properties of the structure being measured. It is known that materials such as steel, water, oil, hydrates and scale as well as other materials have different dielectric properties, and as such will reflect an electromagnetic pulse providing an interface or anomaly location measurement. It is also understood that electromagnetic mode changes will occur within the structure being measured, and that particular mode patterns being produced can be advantageous or restrict the measurement process. As an electromagnetic pulse is transmitted through a waveguide, it is known that the mode or modes, TEnn, will change until a dominant mode for the structure being scanned is formed. The tubing string and annulus in this instance is forming a waveguide, and as such, known mode formation and stability will occur. In the annulus the pulse is transmitted as a TEM mode and is not subject to mode instability.

The electromagnetic pulse reflection measurement within the waveguide is obtained from the dielectric reflections as well as from surfaces within the waveguide reflecting energy; it is known that tubing and casing joints, wellhead connections, gate valves and other restrictions, as well as dielectric anomalies, will provide reflections and as such measurement information. Also known are the effects of dispersion on the electromagnetic pulse caused by the surface finish, material selection, surface condition and surface coatings of the tubing or casing inside diameters. The effects of dispersion and dielectric anomalies affect the time taken by the pulse to travel from the transmitter to the interface and back to the receiver, which time provides an indication of the level of fluid in the tank.

WO 2014/199179 (to the present Applicant) discloses a method for detecting a downhole feature in a well, the method comprising: sealing a well; and then transmitting an electromagnetic signal from a first position located substantially at or adjacent to surface through a first space to the downhole feature; and receiving the electromagnetic signal at a second position located substantially at or adjacent to surface after reflection of the electromagnetic signal from the downhole feature and after propagation of the electromagnetic signal through a second space. The first space and the second space can be the same space.

GB 2 535 278 A (to the present Applicant) discloses a structure defining an elongate space, the structure comprising an apparatus installed within the structure, wherein the apparatus comprises or includes: a signal generator and detector arrangement; and at least one antenna coupled to the signal generator and detector arrangement, wherein the at least one antenna is coupled to the elongate space for transmitting an electromagnetic signal into the elongate space and for receiving the electromagnetic signal from the elongate space after reflection of the electromagnetic signal from a feature within the elongate space.

GB 2 570 957 B (to the present Applicant) discloses an apparatus for detecting a downhole feature in a well, the apparatus being adapted to be provided in a casing of a wellbore, the apparatus comprising a first tube which is fluid and/or liquid permeable and comprises a first waveguide.

It is an object of at least one embodiment of at least one aspect of the present invention to seek to obviate and/or mitigate one or more problems or disadvantages in the prior art.

SUMMARY OF INVENTION

According to the present invention there is provided a detection device, use of a cable, a detection apparatus, a detection method and a space or structure according to the appended claims.

According to a first aspect of the present invention there is provided a detection device such as a material/fluid detection device. The detection device or fluid and/or material detection device may comprise an electromagnetic transmitter and/or receiver arrangement or device comprising or provided in or on a cable or transmission line.

(Hereinafter, the term "cable" will be used, but such term will be understood to mean, include and/or be synonymous with the term "transmission line").

The cable may act as an antenna, e.g., transmitter and/or receiver.

The fluid level detection device may comprise a liquid level detection device and/or particulate (particulate containing fluid) detection device.

At least a portion of the cable may be rigid and/or stiff, e.g., not flexible, bendable and/or reelable. The (at least a portion of the) cable may have a length of from 0.1 meters to 10 meters, e.g., 1 meter to 5 meters, e.g., 3 meters.

The cable may comprise a coaxial cable or line (or a triaxial cable).

The cable may comprise a radiating (coaxial) cable or line (RC) and/or a leaky feeder (LF) or leaky (coaxial) cable or a hybrid of such with a (standard) coaxial cable.

The cable may comprise a termination, e.g., at an end or distal end thereof.

The cable may be electrically/electromagnetically connected to a further cable.

The further cable may comprise a further coaxial cable.

The cable may comprise a first or inner conductor. The first conductor may comprise a wire or tube, e.g., a copper wire or tube.

The cable may comprise a second or outer conductor. The second conductor may comprise a cylinder and/or foil and/or braid, e.g., a copper cylinder/foil/braid. One or more apertures or slots, e.g., a plurality of apertures or slots, may be provided on the second conductor. The plurality of apertures or slots may be provided in a spaced relation along at least part of a length of the second conductor. The/each aperture or slot may extend around at least part of a periphery or circumference of the second conductor. At least some or all of the plurality of apertures or slots may be peripherally or circumferentially aligned with one another.

The slots may be linear, curved or spiral in shape, or of other suitable shapes.

The aperture(s) or slot(s) may act, in use, as an antenna. The aperture(s) or slot(s) may act, in use, as a/the electromagnetic transmitter(s) from and/or a receiver(s) to the second conductor and/or the cable. The size and/or shape of the aperture(s) or slot(s) may predetermine a frequency or frequencies of transmission and/or reception.

The first conductor may be provided within, e.g., substantially concentrically within, the second conductor.

The cable may comprise a dielectric, e.g., a dielectric layer, which may be provided between the first and second conductors, e.g., substantially concentrically between the first and second conductors.

The cable may comprise an outer layer or jacket, which may be an electrically insulating layer. The outer layer or jacket may impart rigidity or stiffness to the or at least part of the cable. The outer layer may be resistant to compressive and/or bending forces. The outer layer may comprise a rigid plastics tube, e.g., PVC tube.

Location markers, such as electrically conductive and/or metallic bands, may be provided on the cable, such as at substantially equally spaced intervals along the cable.

According to a second aspect of the present invention there is provided use of a cable or transmission line as, or a cable or transmission line when used as, a material/fluid detection device. The cable or transmission line may comprise an electromagnetic transmitter and/or receiver arrangement or device. The material/fluid detection device may comprise a fluid and/or material detection device according to the first aspect of the present invention.

According to a third aspect of the present invention there is provided an apparatus comprising at least one material/fluid detection device according to the first aspect of the present invention.

The apparatus may comprise a further cable or line (hereinafter "further cable"). The cable may be electrically/electromagnetically connected to the further cable, e.g., to one end of the further cable. The one end of the further cable may be connected to one end of the cable, e.g., be a connector, e.g., an electrical connector.

The further cable may comprise a coaxial cable (or a triaxial cable).

The further cable may comprise a further first or inner conductor. The further first conductor may comprise a wire or tube, e.g., a copper wire or tube.

The further cable may comprise a further second or outer conductor. The second conductor may comprise a cylinder and/or foil and/or braid, e.g., a copper cylinder/foil/braid.

The further first conductor may be provided within, e.g., substantially concentrically within, the further second conductor.

The further cable may comprise a further dielectric, e.g., a dielectric layer, which may be provided between, e.g., substantially concentrically between, the further first and second conductors.

The further cable may comprise a further outer layer or jacket, which may be an electrically insulating layer.

The apparatus may further comprise a transmitter and/or a receiver. The transmitter and/or the receiver may be electrically/electromagnetically connected to another end of the further cable.

The cable and/or at least part of the further cable may be provided within a space, e.g., an elongate and/or enclosed space. The transmitter and/or the receiver may be provided external of the space.

According to a fourth aspect of the present invention there is provided a structure comprising a space having at least one material/fluid detection device according to the first aspect of the present invention or an apparatus according to the third aspect of the present invention.

The device of the present invention may be used in an enclosed structure, e.g., a cased borehole or well. The device may be at least partially and preferably fully provided within the (enclosed) structure. The (enclosed) structure/borehole/well may be sealed or unsealed during use of the device. The (enclosed) structure/borehole/well may be ground/earth/seabed penetrating. The (enclosed) structure/borehole/well may be disposed substantially or at least partially vertically.

The space may be an elongate and/or enclosed space.

The space may be selected from one of: a subterranean hole, a borehole, a wellbore, a mineshaft. Alternatively, the space may be a vessel or a container.

The space may comprise a hydrocarbon (gas/oil) well, an aquifer well and/or a water well. The well may be a completed well.

The space may comprise a bore of a production tubing.

The space may comprise an annulus between a production tubing and a wellbore casing.

In one implementation the device/cable may be provided within the bore or within the annulus.

In an alternative implementation the device/cable may be provided within, e.g., integrally within a wall of the production tubing or the well casing. The device/cable may be provided between inner and outer facing walls of a pipe or tubular.

The space/elongate space may be sealed or may be unsealed, e.g., from a surrounding or external environment.

The space/elongate space may be pressurized, e.g., at a pressure above that of a surrounding or external environment.

According to a fifth aspect of the present invention there is provided a method of detecting and/or determination and/or measuring and/or monitoring a level and/or position of a material/fluid or fluid interface within a space.

The method may comprise one or more of:

providing a fluid detection device according to the first aspect of the present invention within the space or electromagnetically coupled to the space;

transmitting and/or receiving an electromagnetic signal from and/or at the fluid detection device.

By this method a presence of a liquid may be detected, measured and/or monitored.

The fluid may comprise a liquid. The fluid interface may comprise a fluid/fluid interface, e.g., a gas/liquid interface.

The space may comprise an elongate and/or enclosed space.

The space may be selected from one of: a subterranean hole, a borehole, a wellbore, a mineshaft.

The space my comprise a hydrocarbon (gas/oil) well, an aquifer well and/or a water well. The well may be a completed well.

The space may comprise a bore of a production tubing.

The space may comprise an annulus between a production tubing and a wellbore casing.

In one implementation the device/cable may be provided within the bore or within the annulus.

In an alternative implementation the device/cable may be provided within, e.g., integrally within a wall of the production tubing or the well casing. The device/cable may be provided between inner and outer facing walls of a pipe or tubular.

The method may comprise sealing and/or pressurizing the space, preferably prior to the step of transmitting the electromagnetic signal.

The following may apply to any of the aforementioned aspects of the present invention.

One or more embodiments of the present invention provide advantage over the prior art in that the present invention can be used to detect more than one fluid/liquid level.

The cable and/or a/the further cable may further comprise or act as a communications conduit(s).

The space may be an elongate space. The space may be a well. The well may be an oil, gas and/or water well. The well may be a production, observation and/or injection well. The well may be a disposal well, e.g., a waste disposal well such as a nuclear waste disposal well.

At least a portion of the cable and/or further cable may be reelable or spoolable.

The cable and further cable may be (electrically) connected via a connector.

The cable may have a substantially circular cross-section.

The further cable may have substantially circular cross-section.

In use, the cable may be provided downhole, below, and/or further inside the space than the further cable.

Alternatively, the cable may be provided external of the space. The cable may in such instance be electromagnetically couple to the space. For example, the cable may be provided in a wellhead or Christmas tree.

In use, the further cable and/or the cable may extend substantially from or through a wellhead or Christmas tree.

In use, the cable and/or the further cable may be provided in a wellbore of the well.

In use, an electromagnetic signal, e.g., microwave signal, may be propagated within the cable, e.g., within the further cable to within the cable.

In use, a partial reflection of the electromagnetic signal may occur at the connector or joint between the respective cable and the further cable. This may be beneficial in providing a reference level or datum point—as a length of the further cable may be known.

The apparatus may further provide an electromagnetic source or antenna (e.g., microwave, millimeter or radio source) which may be connected to another end of the further cable.

The electromagnetic source may comprise a transmitter. The electromagnetic source may comprise a receiver.

The electromagnetic source (e.g., microwave source, transceiver or transmitter and/or receiver) may be provided external of the wellhead and/or Christmas tree. The source may be placed within the wellhead or attached to the wellhead. In use, in a transmission path, an electromagnetic signal may propagate from the transmitter through the further cable. The further cable may extend from the source. (or transmitter) through the wellhead and/or the Christmas tree. In said transmission path, the electromagnetic signal may propagate through the connector.

In said transmission path the electromagnetic signal may propagate through the cable, e.g., until a fluid/liquid interface(s) is met. At said fluid/liquid interface(s) the electromagnetic signal may be at least partially reflected. The reflected electromagnetic signal(s) may then be received by the cable and propagate through the cable, the connector, and/or the further cable in a received, return, reflected and/or reverse path. The reflected signal(s) may be received by the source (or receiver). The cable (radiating cable/leaky feeder/coax) may act as a plurality or multitude of antennas or transmitters and/or receivers.

In this way the invention may be used to determine a position or depth of a fluid interface(s) within a space or a wellbore of the well, e.g., by determining the time taken for the electromagnetic signal to be transmitted and then received.

One particular advantage of at least one embodiment of the present invention is that the provision of a single cable or transmission line gives rise to a single feedthrough in/on a wellhead. This simplifies installation and/or provides for increased robustness, in use.

The electromagnetic signal may beneficially comprise a microwave signal, or alternatively a millimeter or radio signal. The electromagnetic signal may have a frequency or frequencies within a range of 1 MHz to 100 MHz, 1 MHz to 1 GHz, 1 GHz to 100 GHz, e.g., 1 GHz to 50 GHz, e.g., 4 GHz to 40 GHz or 20 GHz to 70 GHz.

The electromagnetic signal may comprise a TEM mode.

The method may comprise detecting, locating, establishing and/or measuring a fluid (e.g., liquid) level and/or interface using a technique comprising: Frequency Domain Reflectometry (FDR), Frequency-Modulated Continuous Wave (FMCVV) and/or Frequency-Modulated Interrupted Continuous Wave (FMiCVV). It will be appreciated that beneficial embodiments of the present invention can utilise Frequency Domain Reflectometry.

According to an aspect of the present invention there is provided a space (e.g., elongate space) or enclosed structure, or a well, such as an oil/gas/water/disposal well, comprising a fluid detection device according to the first aspect of the present invention or an apparatus according to the third aspect of the present invention.

The well may be a production well.
The well may be an injection/artificial lift well.
The well may comprise a completed/sealed well.
The well may comprise a wellbore casing.
The well may comprise a production tubing.
The well may comprise a wellhead.
The well may comprise a Christmas tree.
The well may be a disposal well.

The further cable and/or the cable may extend through the wellhead/Christmas tree, e.g., through a port in the Christmas tree.

The apparatus or system may extend within the well, e.g., within a/the production tubing or in an annulus between a/the wellbore casing and a/the production tubing.

BRIEF DESCRIPTION OF DRAWINGS

Embodiments of the present invention will now be described by way of example only, and with reference to the accompanying drawings, which are.

DETAILED DESCRIPTION OF DRAWINGS

Figure 1:
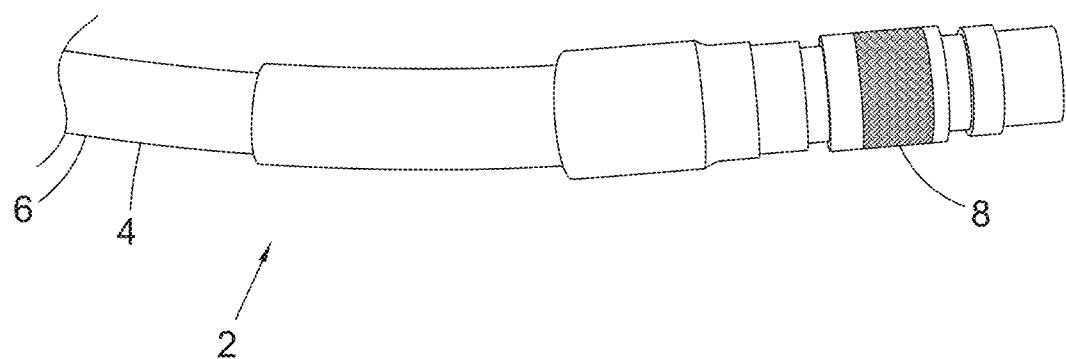
FIG. 1 a termination end of a fluid detection device comprising a cable according to the present invention.
Figure 2:
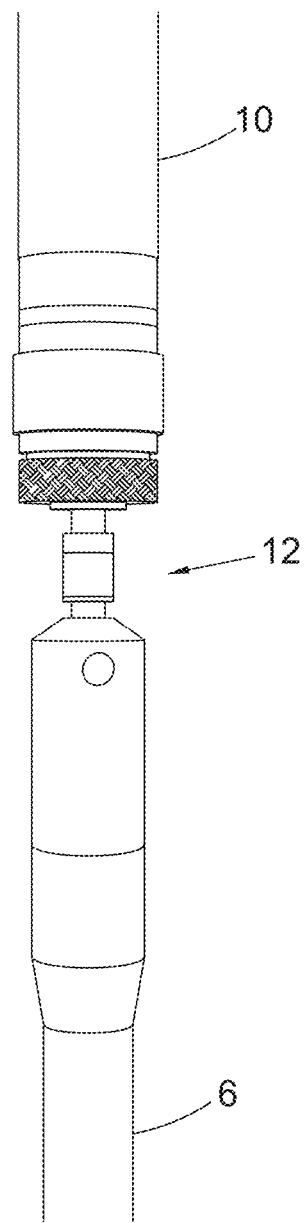
FIG. 2 a connector connecting an end of the cable of FIG. 1 to an end of a further cable.

Referring to FIGS. 1, 2, 8 and 9 there is illustrated a fluid detection device, generally designated 2, according to an embodiment of the present invention. The fluid detection device 2 comprises an electromagnetic transmitter and/or receiver arrangement or device 4 comprising a cable 6 or transmission line.

The cable 6 acts as an antenna, e.g., transmitter and/or receiver. The fluid level detection device 2 comprises a liquid level detection device and/or particulate detection device.

At least a portion of the cable 6 is rigid and/or stiff, e.g., not flexible, bendable and/or reelable. The (at least a portion of the) cable 6 can have a length of from 0.1 meters to 10 meters, beneficially 1 meter to 5 meters, and advantageously around 3 meters.

The cable 6 comprises a coaxial cable. The cable 6 comprises a radiating cable (RC) and/or a leaky feeder (LF). Such RCs and/or LFs are available commercially, e.g., from Siemens under the name 'R-Coax'. However, such cables have not hitherto found use in fluid detection or fluid level detection. The cable 6 comprises an end termination and/or load 8 which provides end reflection.

The cable 6 is electrically/electromagnetically connected to a further cable 10 or transmission line via a connector 12.

The further cable 10 comprises a further coaxial cable.

The cable 6 comprise a first or inner conductor 14. The first conductor 14 comprises a wire or tube, e.g., a copper wire or tube.

The cable 6 comprises a second or outer conductor 16. The second conductor 16 comprises a cylinder and/or foil and/or braid, e.g., a copper cylinder/foil/braid. One or more apertures or slots 18, e.g., a plurality of apertures or slots, are provided on the second conductor. The plurality of apertures or slots 18 are provided in a spaced relation along at least part of a length of the second conductor 16. The/each aperture or slot 18 extends around at least part of a periphery or circumference of the second conductor 16. At least some or all of the plurality of apertures or slots 18 are peripherally or circumferentially aligned with one another. The apertures or slots 18 can be linear, curved or spiral in shape, or of other suitable shapes.

The aperture(s) or slot(s) 18 act, in use, as an antenna. The aperture(s) or slot(s) may act, in use, as a transmitter(s) from and/or a receiver(s) to the second conductor 16 and/or the cable 6. The size and/or shape of the aperture(s) or slot(s) may predetermine a frequency or frequencies of transmission and/or reception.

The cable 6 comprises a dielectric 20, e.g., a dielectric layer, which is provided between the first and second conductors 14, 16.

The cable 6 comprises an outer layer or jacket 21, which is advantageously an electrically insulating layer. The outer layer or jacket may impart rigidity or stiffness to the cable. The outer layer may be resistant to compressive and/or bending forces. The outer layer may comprise a rigid plastics tube, e.g., PVC tube.

The present invention provides use of the cable 6 as, or the cable 6 when used as, a fluid detection device 2, the cable 6 comprising an electromagnetic transmitter and/or receiver arrangement or device 4.

Figure 4:
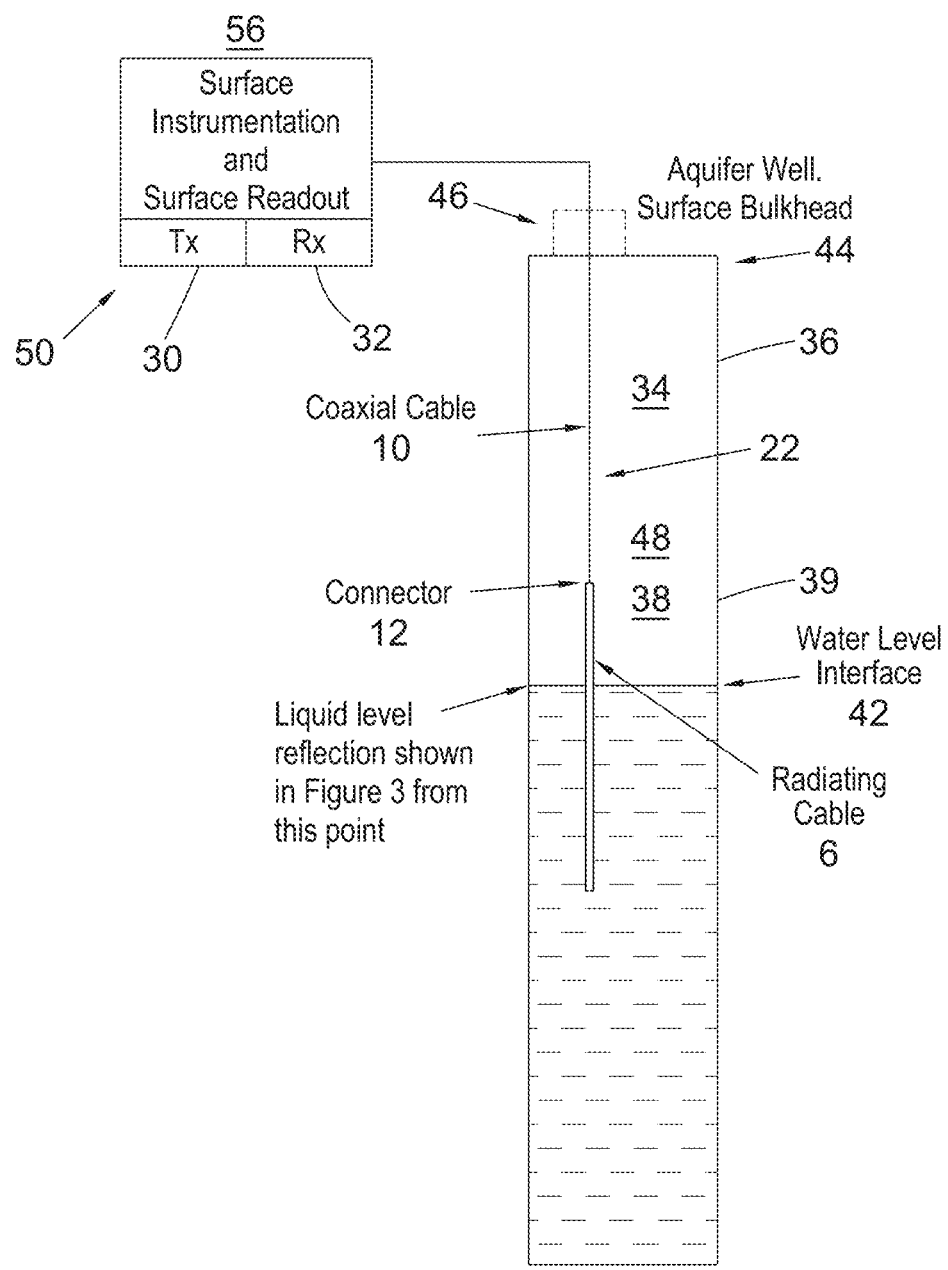
FIG. 4 a schematic diagram of a structure comprising an aquifer well according to an embodiment of the present invention having a cable according to FIG. 1.
Figure 5:
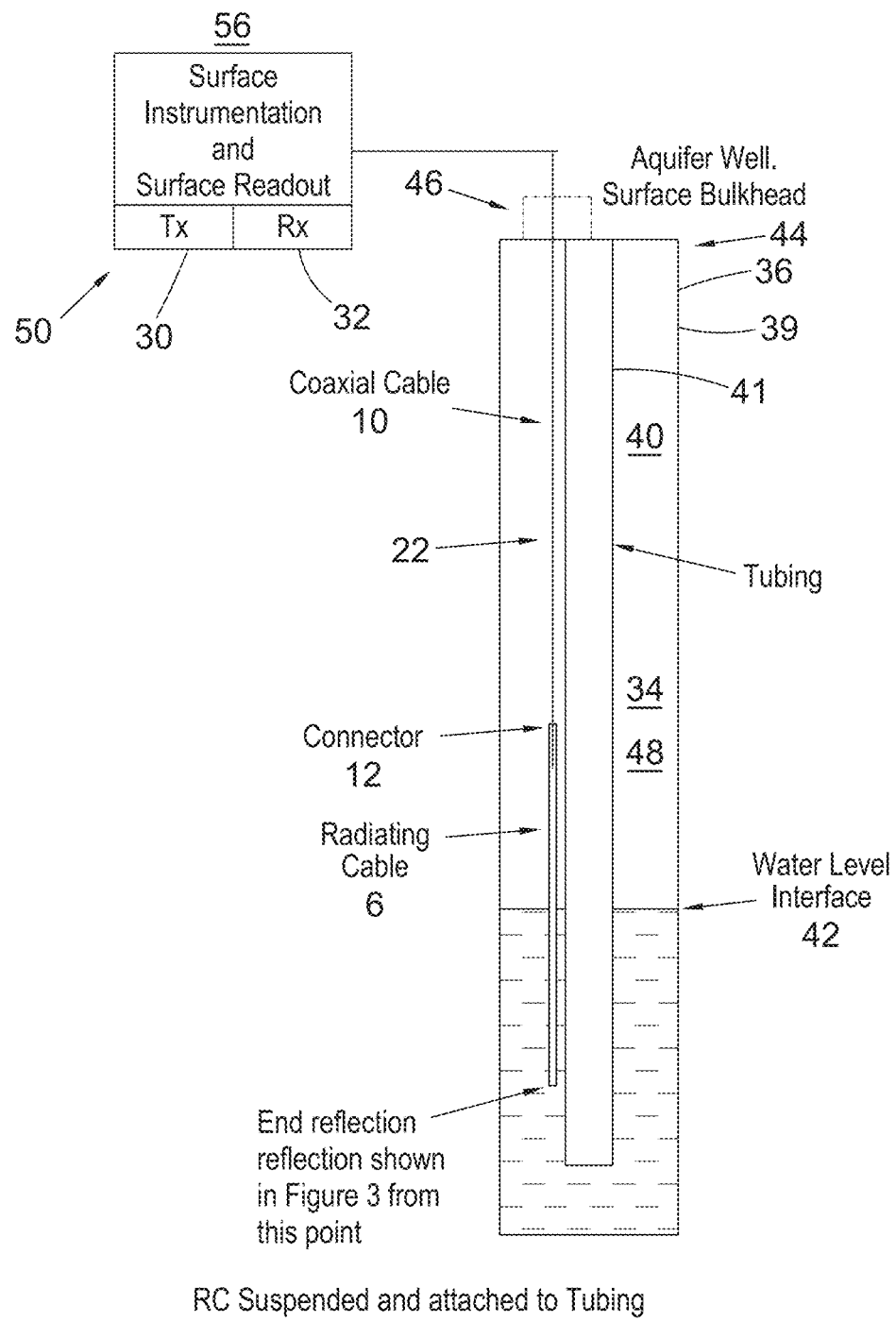
FIG. 5 a schematic diagram of an alternative structure comprising an aquifer well according to an embodiment of the present invention having a cable according to FIG. 1.

Referring to FIGS. 4 and 5, the present invention provides an apparatus, generally designated 22. The apparatus 22 comprises at least one fluid detection device 2 as hereinbefore described.

The apparatus 22 comprises further cable 10. The cable 6 is electrically/electromagnetically connected to the further cable 10, i.e., to one end of the further cable 10. The one end of the further cable 10 is connected to one end of the cable 6 be electrical connector 12.

Figure 7:
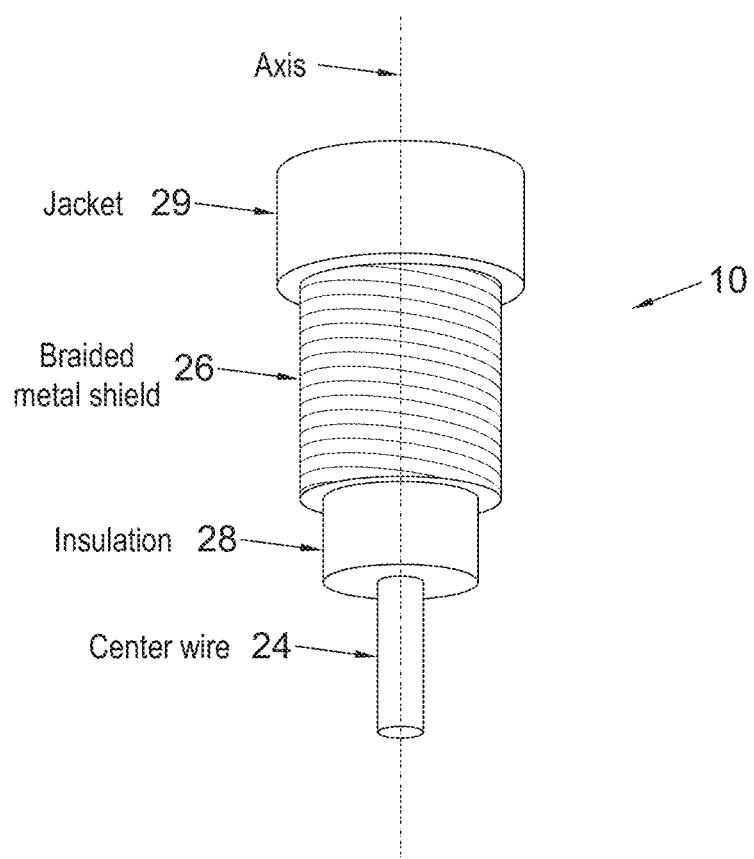
FIG. 7 a cut-away schematic diagram of a typical coaxial cable such as the further cable of FIG. 2.

The further cable 10 comprises a coaxial cable (see FIG. 7).

The further cable 10 comprises a further first or inner conductor 24. The further first conductor 24 comprises a wire or tube, e.g., a copper wire or tube.

The further cable 10 comprises a further second or outer conductor 26. The second conductor 26 comprises a cylinder and/or foil and/or braid, e.g., a copper cylinder/foil/braid.

The further cable 10 comprises a further dielectric 28, e.g., a dielectric layer, which is provided between the further first and second conductors.

The further cable 10 comprises a further outer layer or jacket 291, which is advantageously an electrically insulating layer.

The apparatus 22 further comprises an electromagnetic transmitter 30 and/or electromagnetic receiver 32. The transmitter 30 and/or the receiver 32 are electrically/electromagnetically connected to another end of the further cable 10.

The cable 6 and/or at least part of the further cable 10 are provided within a space 34, e.g., an elongate space. The transmitter 30 and/or the receiver 32 are provided external of the space 34.

The present invention provides a structure, generally designated 36. The structure 36 comprises space 34 having at least one fluid detection device 2 according to the present invention as hereinbefore described.

In this embodiment the space 34 is an elongate space.

The space 34 can be selected from one of: a subterranean hole, a borehole, a wellbore, a mineshaft. Alternatively, the space may be a vessel or a container.

The space 34 can comprise a hydrocarbon (gas/oil) well, an aquifer well and/or a water well. The well can be a completed well.

The space 34 can comprise a bore 38, e.g., a bore of a casing 39 or tubing—see FIG. 5. The space 34 can comprise an annulus 40, e.g., between a tubing 41 and a casing 39 casing production tubing and a wellbore casing.

The space/elongate space 34 can be sealed or can be unsealed, e.g., from a surrounding or external environment.

The space/elongate space 34 can be pressurized, e.g., at a pressure above that of a surrounding or external environment.

The present invention provides a method of detecting and/or determining and/or measuring and/or monitoring a presence, level and/or position of a fluid or fluid interface within a space, the method comprising:

providing a fluid detection device 2 as hereinbefore described within the space 34;

transmitting and/or receiving an electromagnetic signal from and/or at the fluid detection device 2.

By this method a presence of a fluid or liquid or fluid/liquid interface 42 can be detected, measured and/or monitored.

The fluid beneficially comprises a liquid. The fluid/liquid interface 42 can comprise a fluid/fluid interface, e.g., a gas/liquid interface.

The space 34 can comprise an elongate space.

The space 34 can be selected from one of: a subterranean hole, a borehole, a wellbore, a mineshaft.

The space 34 can comprise a hydrocarbon (gas/oil) well, an aquifer well and/or a water well. The well can be a completed well.

The space 34 can comprise a bore 38 of a tubing or casing 39, e.g., a production tubing—see FIG. 4.

The space 34 can comprise an annulus 40 between a tubing 41 and a casing 39, e.g., a production tubing and a wellbore casing.

The method can comprise sealing and/or pressurizing the space 34, beneficially prior to the step of transmitting the electromagnetic signal.

The cable 6 and/or the further cable 10 can further comprise or act as a communications conduit(s)—thus potentially having a dual function.

The space 34 can an elongate space. The space 34 can be a well. The well can be an oil, gas and/or water well. The well can be a production, observation and/or injection well. The well can be a disposal well, e.g., a waste disposal well such as a nuclear waste disposal well.

At least a portion of the cable 6 and/or further cable 10 can be reelable or spoolable.

The cable 6 and further cable 10 are (electrically) connected or connectable via connector 12.

The cable 6 can have a substantially circular cross-section.

The further cable 10 can have substantially circular cross-section.

In use, the cable 6 can be provided downhole, below, and/or further inside the space 34 than the further cable 10.

In use, the further cable 10 and/or the cable 6 can extend substantially from or through a wellhead 44 or Christmas tree 46.

In use, the cable 6 and/or the further cable 10 can be provided in the wellbore 48 of the well.

In use, an electromagnetic signal, e.g., microwave signal, is propagated within the cables 6, 10, e.g., within the further cable 10 to within the cable 6.

In use, a partial reflection of the electromagnetic signal can occur at the connector 12 or joint between the cable 6 and the further cable 10. This can be beneficial in providing a reference level or datum point—as a length of the further cable 10 is known.

The apparatus 22 further provides an electromagnetic source 50 (e.g., microwave, millimeter or radio source) which is connected to another end of the further cable 10.

The electromagnetic source 50 comprises transmitter 30. The electromagnetic source 50 comprises receiver 32. The electromagnetic source 50 comprises a transceiver.

The electromagnetic source 50 (e.g., microwave transmitter and/or receiver) is provided external of the wellhead 44 and/or Christmas tree 46. In use, in a transmission path, an electromagnetic signal propagates from the transmitter 30 through the further cable 10. The further cable 10 extends from the source 50 (or transmitter 30) through the wellhead 44 and/or the Christmas tree 46. In said transmission path, the electromagnetic signal propagates through the connector 12. In said transmission path, the electromagnetic signal propagates through the cable 6, e.g., until a fluid/liquid interface(s) 42 is met. At said fluid/liquid interface(s) 42 the electromagnetic signal is at least partially reflected. The reflected electromagnetic signal(s) then propagates through the cable 6, the connector 12, and/or the further cable 10 in a received, return, reflected and/or reverse path. The reflected signal(s) is received by the source 50 (receiver 32). The source 50 (transceiver) can be attached to the wellhead 44 or be part of the wellhead 44. Alternatively, the source 50 or transceiver can be installed within the wellhead 44.

In this way the invention can be used to determine a position or depth of a fluid interface(s) 42 within a space 34 or a wellbore 48 of the well, e.g., by determining the time taken for the electromagnetic signal to be transmitted and then received.

The electromagnetic signal beneficially comprises a microwave (MW) signal, or alternatively a millimeter or radio signal. The electromagnetic signal beneficially has a frequency or frequencies within a range of 1 MHz to 100 MHz, 1 MHz to 1 GHz, 1 GHz to 100 GHz, e.g., 1 GHz to 50 GHz, e.g., 4 GHz to 40 GHz or 20 GHz to 70 GHz.

The electromagnetic signal beneficially comprises a TEM mode.

The method advantageously comprises detecting, locating, establishing and/or measuring a fluid (e.g., liquid) level and/or interface using a technique comprising: Frequency Domain Reflectometry (FDR), Frequency-Modulated Continuous Wave (FMCW) and/or Frequency-Modulated Interrupted Continuous Wave (FMiCVV).

According to an embodiment of the present invention there is provided a well, such as an oil/gas/water/disposal well, comprising a fluid detection device 2 as hereinbefore described or an apparatus 22 as hereinbefore described.

The well can be a production well.
The well can be an injection/artificial lift well.
The well can comprise a completed/sealed well.
The well can comprise a wellbore casing.
The well can comprise a production tubing.
The well can comprise a wellhead.
The well can comprise a Christmas tree.
The well can be a disposal well.

The further cable 10 and/or the cable 6 can extend through the wellhead 44/Christmas tree 46, e.g., through a port in the Christmas tree.

The apparatus 22 can extend within the well, e.g., within a/the production tubing or in an annulus between a/the wellbore casing and a/the production tubing.

It will be appreciated that the present invention provided a fluid detection device 2 comprising a cable 6 which can be utilized as a subsurface radiating surveillance and/or measurement cable.

Previous patent disclosures by the present Applicant have described methods of retrieving subsurface measurements via MW FDR and FMCW scanning transmissions thereby eliminating the requirement of running any in-well instrumentation, communication and or power wires. The data retrieved via the MW transmissions consisted of length measurements, pressure, temperature and permittivity.

In applications of the technology there are circumstance, e.g., in low-cost applications such as aquifer wells, that require a system that requires a hybrid solution according to the present invention.

The basic concept is to remove the downhole gauge 52 normally deployed to obtain bottom hole pressure (see FIG. 12) and, therefore, obtain a fluid level. Downhole gauge applications are a mature technology and are prone to failures, electronic drift and require a power supply, calibration and maintenance. Since such are deployed below surface retrieval operations can be costly, difficult and have a high operational risk profile.

The present invention replaces the downhole gauge 52 and rather deploys a Radiating Cable (RC) or Leaky Feeder (LF) (cable 2)

Previously an RC/LF has been deployed for communication and automation uses in an atmospheric environment. Embodiments of the present utilize an RC/LF into a subsurface well environment where environmental elements will include various gasses and liquids that may be present at atmospheric pressure and temperatures ranging to but not limited to 10,000 psi and 100° C.

The LF/RC is deployed/run into bore 40 (wellbore 48) or run into a well annulus 40 deployed as a single or duplex system consisting of the LF/RC and/or industry standard coaxial cable (further cable 10) capable of withstanding the subsurface conditions. The surface or top end of the LF/RC is attached to a surface structure such as a wellhead or supporting plate or flange 54. A lower end of the cable 2 can be free-hanging or attached to a mass or structure that has been deployed into the bore 38 or annulus 40. Normal end points from a well will be the wellhead through the Xmas Tree of through a side Xmas Tree exit or annuls exit.

The coaxial, and other configurations such as triaxial cable or any other communications line capable of transmitting a Transverse Electrical Magnetic (TEM) signal will allow the W3S FDR and FMCW techniques to be deployed such that signals—either continuous wave or pulsed—can be used to detect subsurface interfaces within a well structure or an elongate space that is sealed or open to the atmosphere. Using bespoke software developed by the present Applicant signals are transmitted and all reflection and signals received by surface instrumentation is converted into required data, such as depth, temperature, pressure and permittivity.

The dimensions and electrical transmission properties of the RC/LF and standard coaxial are well understood, and as such very predictable signal transmissions can be achieved providing valuable subsurface data measurements and as a data transmission conduit.

The RC/LF and standard coaxial products are normally supplied in reels of between 10 to 1000+ meter lengths. The Applicant proposes to use 1 to 10+ meter lengths of stiff sections that can be used for placement over a particular area of the well where liquid level movement is required with standard coaxial being used for the return signal path back to surface. However, this does not negate running a complete length of RC/LF over the area of interest back to surface.

Depth limitations will be defined by the properties of the cables deployed and the frequencies of transmissions used. In general terms, the lower the frequency the longer the distance of transmissions. For spatial definition, it is generally accepted that using higher the frequencies and/or bandwidths used will provide a higher degree of accuracy of the measurement technique. The accuracy of measurement across all frequencies will be in the mm to micron range. Distance range is expected to cover but not limited to 0.5 to 2000+ meters.

The RC/LF is run into the well with a sealed termination component (end termination 8) attached on an end of the cable 6 (see FIG. 1). This provides a clear indication from the well scan that the cable end has been identified. It also establishes a datum in the well as the end of the cable is suspended or attached to a geophysical stationary point. Other connections within the apparatus 22 (see FIG. 2) also provide reflections that can be used for reference and correlation.

Figure 3:
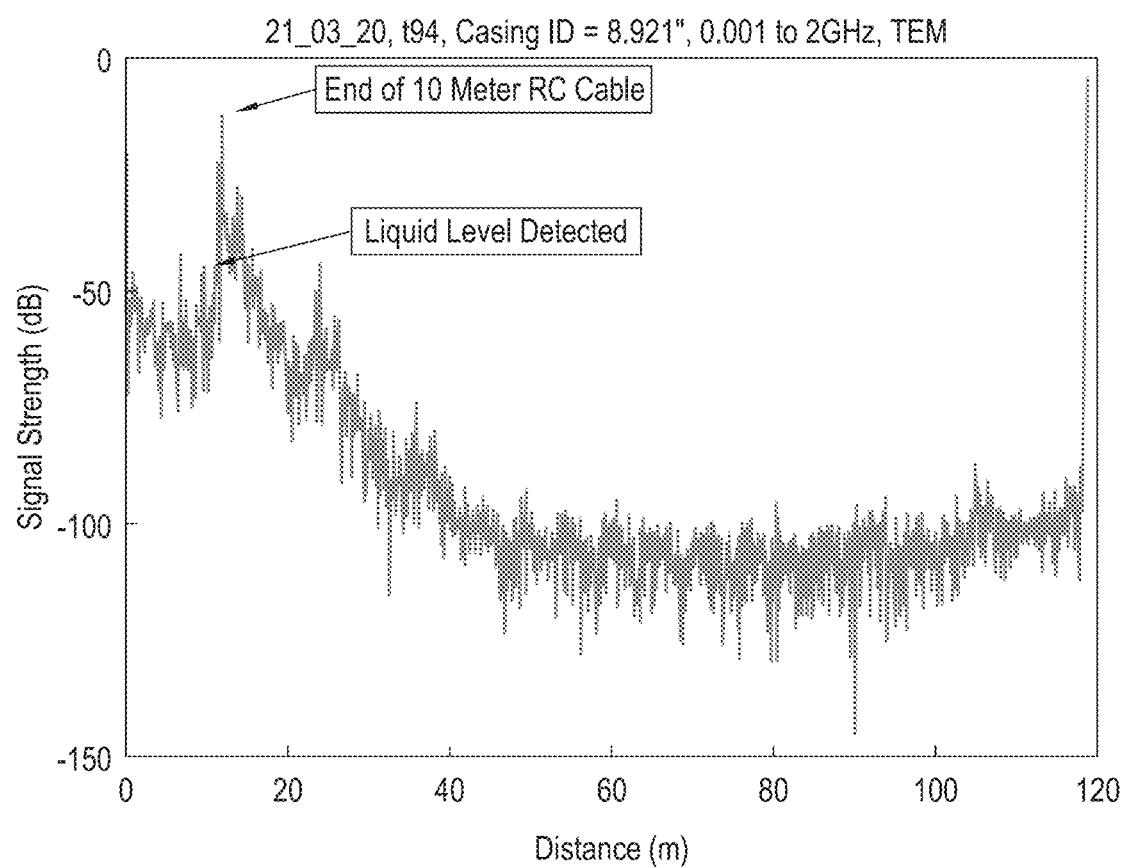
FIG. 3 a read out received signal versus distance from an apparatus according to an embodiment of the present invention having a cable according to FIG. 1.

FIG. 3 shows a scan taken of a 10-meter RC suspended in a vessel with a pre-set water level. The water/air interface was clearly identifiable and the measured lengths recorded confirmed with physical measurement.

FIGS. 4 and 5 show schematic representations of an RC (cable 2) deployed to monitor liquid level movement. FIG. 4 shows a free-hanging monitoring RC. FIG. 5 shows an RC suspended and attached to a tubing.

The RC/LF may be run as a continuous length from a surface readout (SRO) 56 to cover the fluid level range or as a combination of standard coaxial cable and RC/LF. All connections should be liquid and pressure tight.

Although the apparatus 22 shown in FIGS. 4 and 5 are deployed in a well construction, it will be appreciated that apparatus 22 can be:
1. deployed in storage tanks and vessels for solids or liquids level measurement and control;
2. deployed in structures for surveillance of liquid levels and permittivity changes;
3. imbedded into structures to measure permittivity and liquid ingress; and/or
4. deployed in underground structures, such as mine shafts for liquid and solid level monitoring and permittivity measurements.

Figure 6:
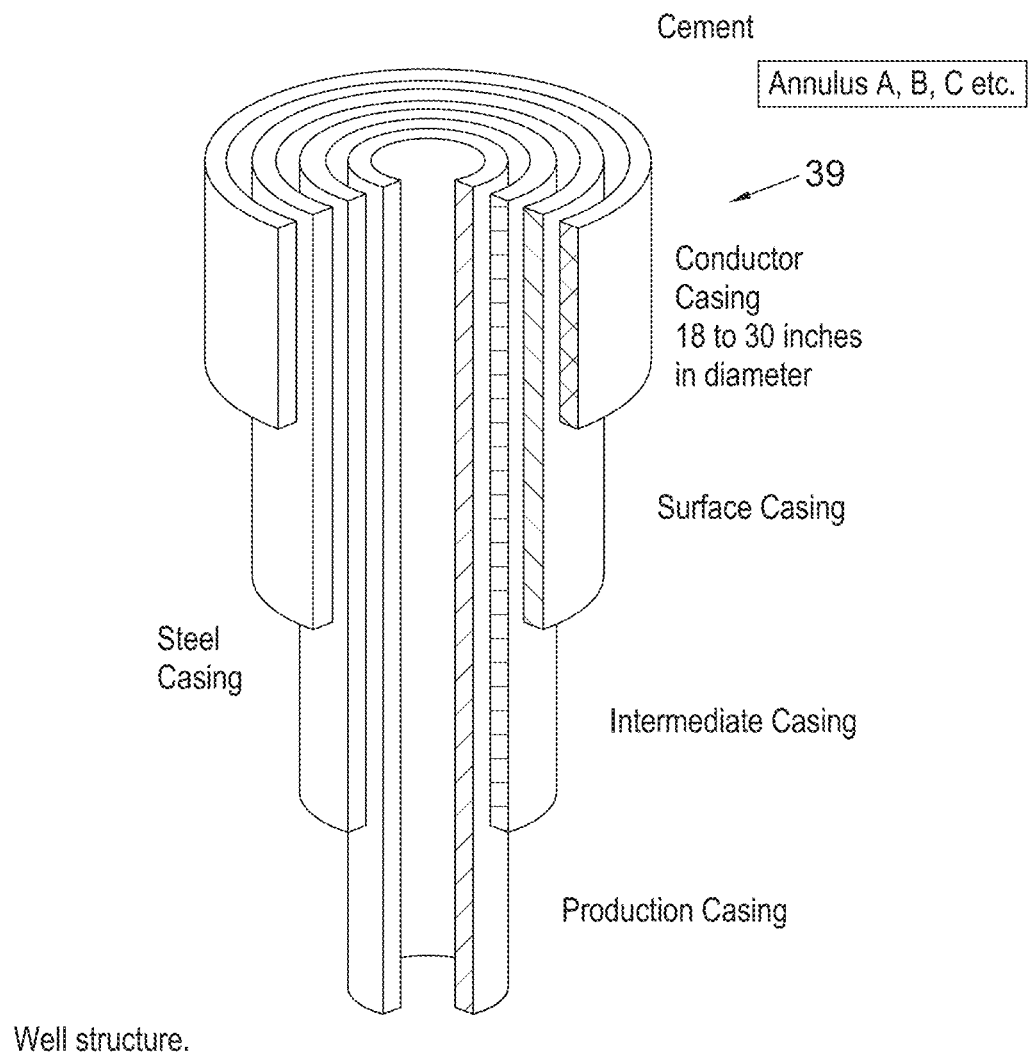
FIG. 6 a cut-away schematic diagram of a structure of a typical completed well.

Referring to FIG. 6, there is shown a part of a structure 36, i.e., well structure, for use in the present invention.

Secondary recovery operations may require the use of a downhole pump to lift well fluids to surface. The produced well fluids require 'artificial lift' techniques that may require gas lift via the annulus 40. Accurately monitoring fluid levels in the annulus 40 will assist with the efficient of producing well fluids using artificial lift techniques. In such cases a critical fluid level must be maintained above the downhole pump intake or gas lift point. Monitoring the fluid level is required to prevent liquid levels to be maintained above the lift mechanisms preventing possible wear of pump components, pump overheating and potential failure of the pump assembly. Should the lift mechanism fail it must be removed and replaced before production can recommence.

The present invention uses as the cable 2 a 'radiating cable' (RC) and/or 'leaky feeder' (LF), i.e., a modified coaxial cable.

Principles of RC/LF electromagnetic radiating cables will now be discussed. The defined variables of an electromagnetic wave are the electric and a magnetic field. The two fields are perpendicular to each other and to the direction of propagation through a cable. The propagation of an electromagnetic wave can be used to send signals. The principal uses are for communication, data transfer and position control purposes.

A standard coaxial cable (e.g., further cable 10) is configured as shown in FIG. 7, and is constructed by using the following components:
1. centre core usually a solid or braided copper wire;
2. a dielectric insulator (usually);
3. a metallic sheath of copper foil or metallic braid;
4. an outer plastic protective insulating jacket; and
5. in some instances, a further metallic outer later for protection can be added.

The copper core of the cable 10 allows for fast transmission of data shielded by a metallic sheath that eliminates external factors such as, but not limited, to fluid ingress and electrical interference from interrupting a signal from propagating. The cable 10 is usually supplied in rolled continuous lengths suitable for use in various applications. The coaxial cable 10 can be manufactured in various configurations to provide a specification that defines attenuation/meter, cable outside diameter, core wire size and dielectric insulating materials. A various combination of factors is normally required to match the coaxial cables to the intended application. The principal objective, however, is to ensure that the MW signal is transferred from the 'send' end of the cable 10 to the receiving end of the cable 10 with minimal signal loss and signal interference.

Reference is made to the further cable 10 of FIG. 7. Electromagnetic waves propagate within coaxial cable 10. The cable 10 has a closed outer conductor (further second conductor 26)—usually a copper or aluminium sheath—therefore, preventing electromagnetic radiation through the outer layers of the cable 10. As no electromagnetic radiation can be detected outside the cable 10, no external electromagnetic fields can affect the electromagnetic wave in the inner conductor (further first conductor 24).

Figure 8:
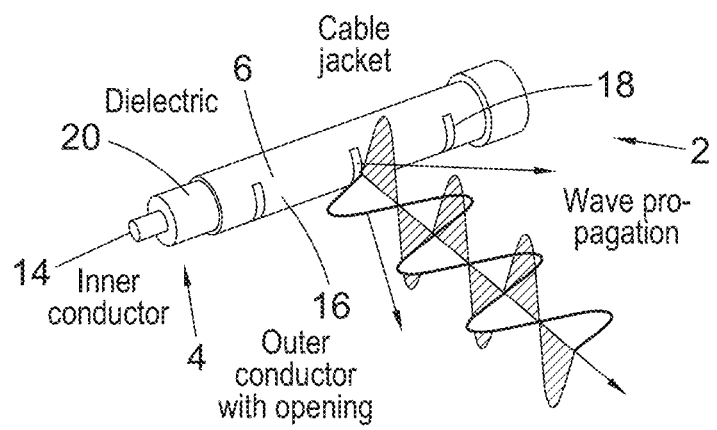
FIG. 8 a cut-away schematic diagram of a coaxial cable comprising the cable of FIG. 1.
Figure 9:
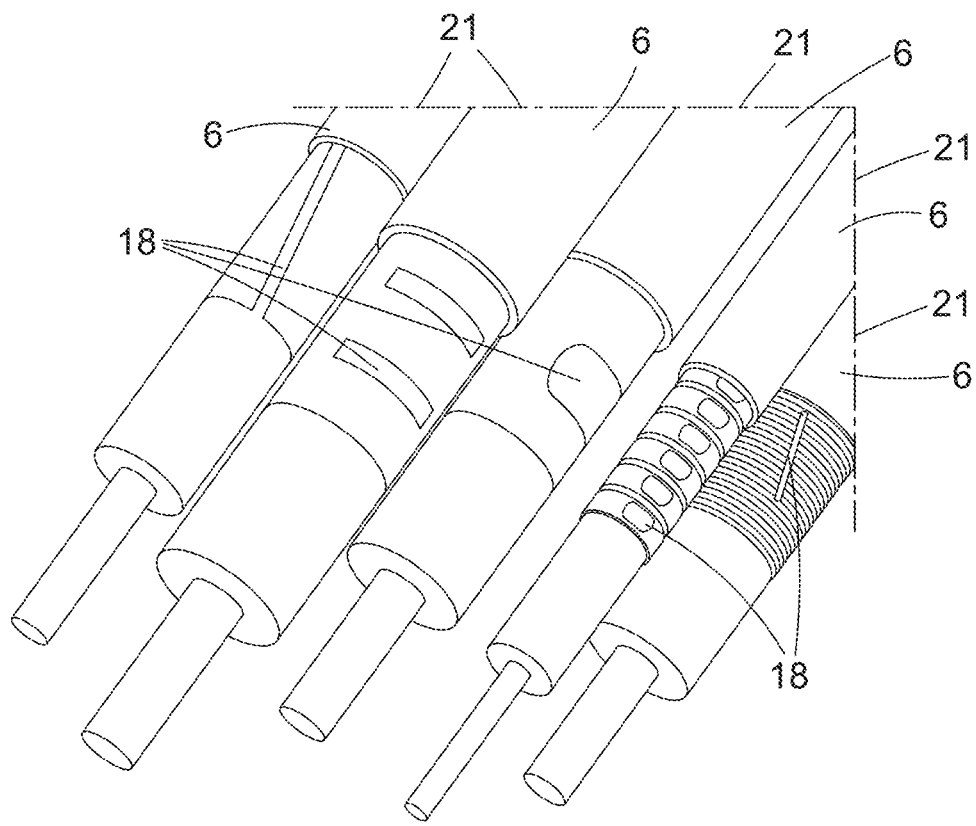
FIG. 9 a series of illustrations comprising cut-away schematic diagrams of possible coaxial cables comprising the cable of FIG. 1.
Figure 10A:
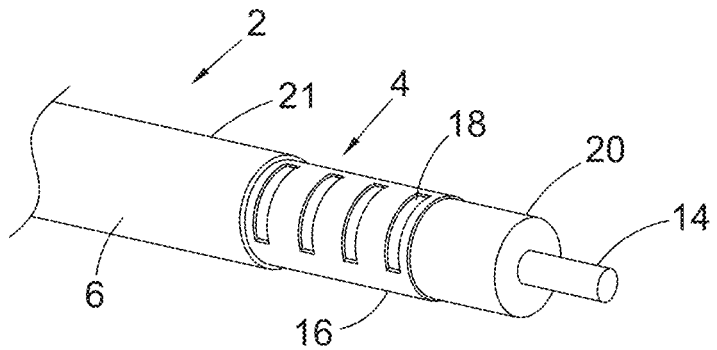
FIG. 10a a cut-away schematic diagram of another coaxial cable suitable for use as the cable of FIG. 1.
Figure 10B:
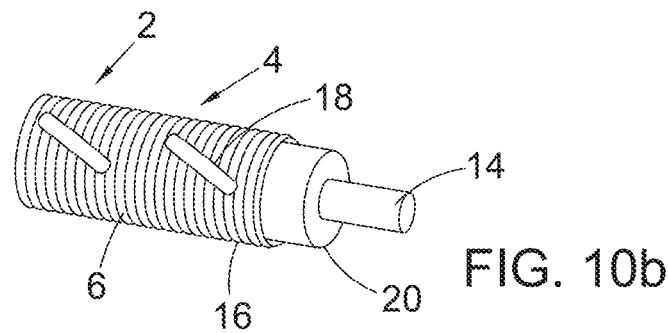
FIG. 10b a cut-away schematic diagram of still another coaxial cable suitable for use as the cable of FIG. 1.

Reference is made to the RC/LF (radiating cable 6) of FIGS. 8 and 9, and also to FIGS. 10a and 10b. If slots 18 or 'leak paths' are provided/positioned on the outer metallic sheath (second conductor 16) an electromagnetic coupling or path will exist between the inner conductor (core) (first conductor 14) and the environment in which the cable 6 has been placed. This configuration allows the electromagnetic fields of the inner conductor to be measured and detected out-with the outer cable surface. In the opposite direction, any electromagnetic field outside the cable 6 can affect the inner conductor. A change to the outer environment in which the radiating cable 6 is positioned will also affect the electromagnetic field, the effects of which can be measured and recorded.

Figure 11:
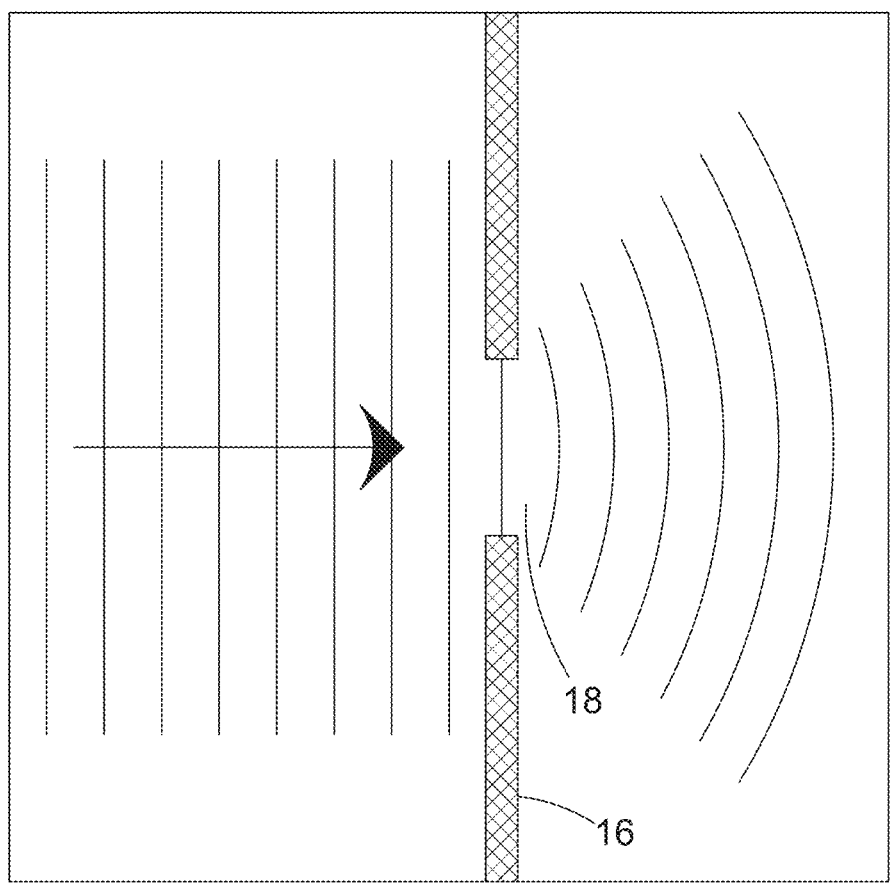
FIG. 11 a schematic diagram illustrating transmission from the cable of FIG. 1.
Figure 18:
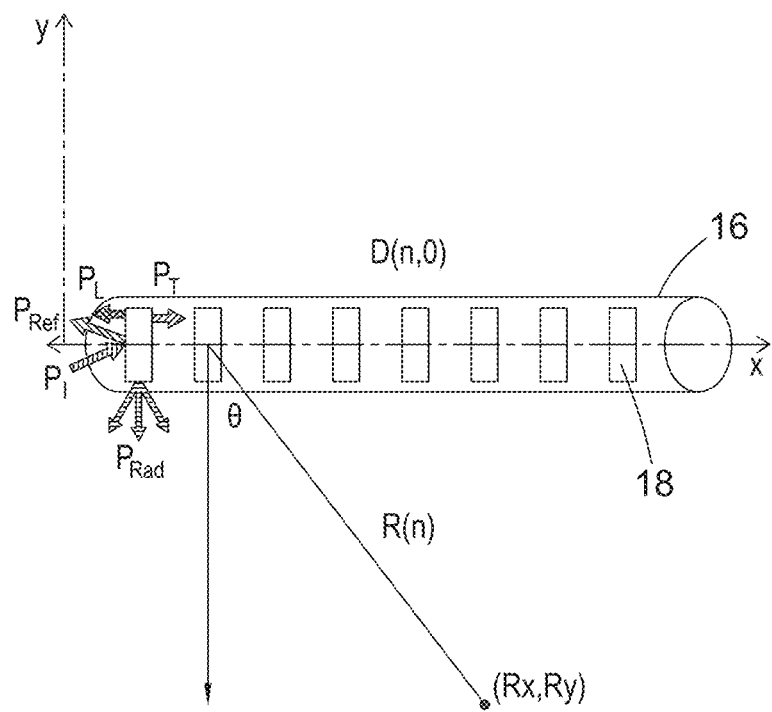
FIG. 18 a schematic illustration of a slotted (transmitting/receiving) portion of the cable of FIG. 1.
Figure 19:
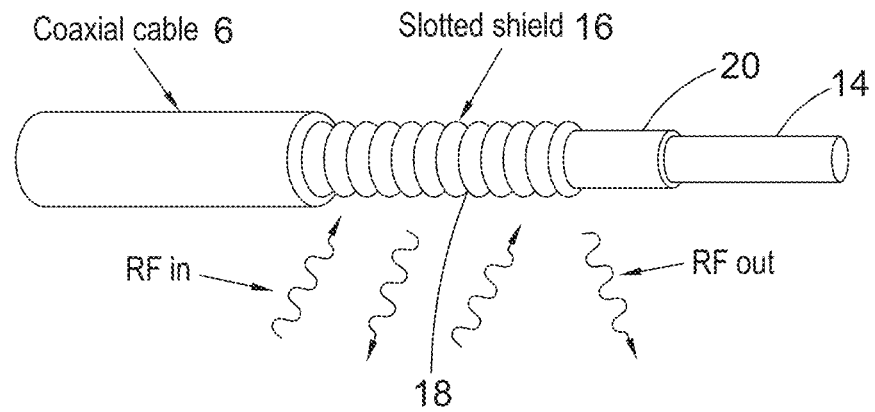
FIG. 19 a cut-away schematic illustration of a cable according to the present invention having a slotted (transmitting/receiving) portion.
Figure 20:
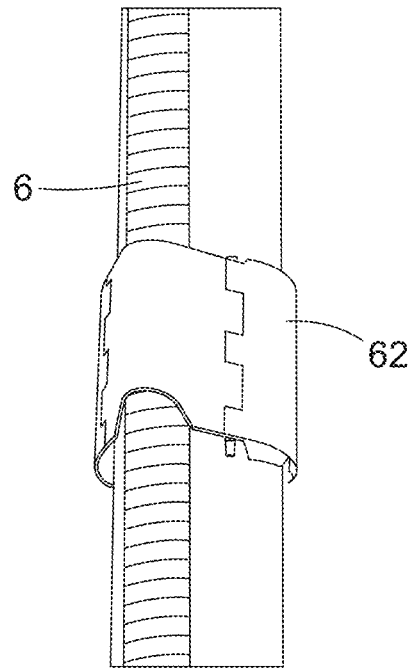
FIG. 20 a further alternative cable positioning device for use in an embodiment of the present invention.

A radiating cable (RC) or leaky feeder (LF) cable (cable 6) is similar to coaxial cable in that signals can be transmitted along the cable length. MW signals are propagated and reflected from a transmitting end to a receiving end. However, the cable 6 is constructed with accurately machined gaps or slots in the outer metallic sheath (second conductor 16) such that signals will leak through the outer cable layers and into the external environment. In effect the radiating cable/leaky feeder can continuously sends and receive signals from out-with a structure of the cable 6 structure. (See FIGS. 10a, 10b and 11 or alternatively FIGS. 18 and 19).

It will be appreciated that cable types, characteristics and dimensions used can be specified using industry standard sizes or specifically manufactured to meet application requirements such as transmission depth, pressure, frequency, attenuation and temperature.

By transmitting a MW frequency signal at frequencies of, but not limited to, 0.001 GHz to 5 GHz, or say 0.001 Hz to 10 GHz or 20 GHz or even 60 GHz, the cable 2 will act as an active antenna detecting changes of impedance in the near vicinity of the cable 2 within a known radiating pattern and strength that will depend upon the frequency and dynamic range of the transmitted signal.

Impedance changes and/or signal disruptions, along the length of the radiating or leaky feeder cable 2, will cause a reflected signal or signals to be emitted from such points (apertures or slots 18) causing signal reflections to be transmitted to surface, where the signal is analysed and data stored. With the necessary surface instrumentation and software using appropriate algorithms and techniques, the reflected signal(s) can be digitized and measured providing data such as attenuation effects and distance measurements to various interfaces from which the reflected signal was initiated.

Figure 12:
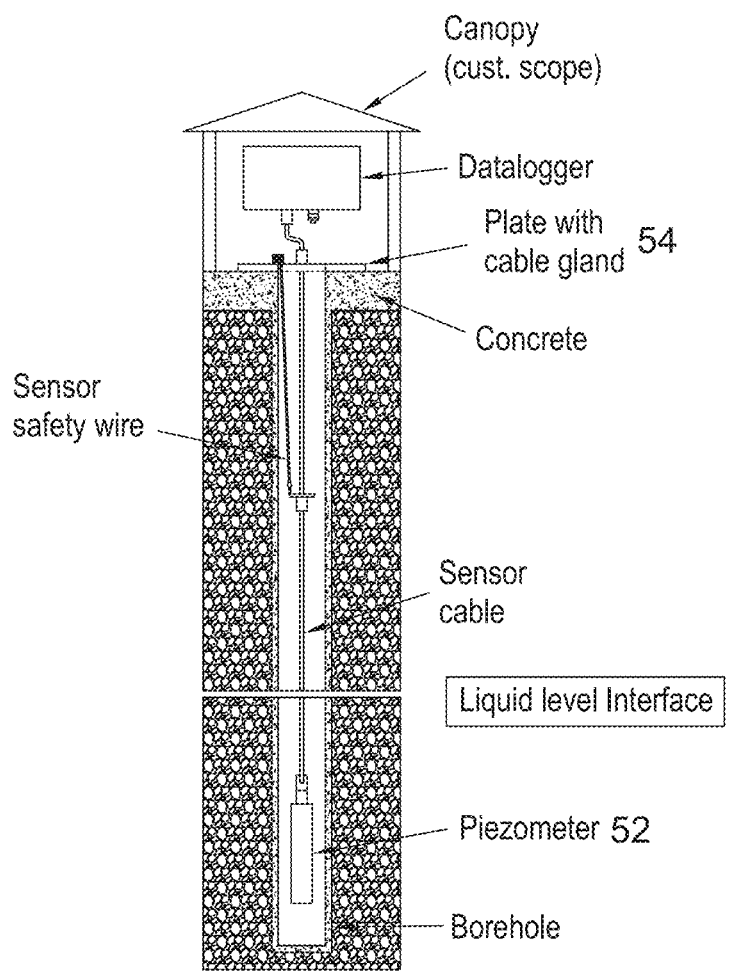
FIG. 12 a schematic diagram of a structure comprising an aquifer well having a fluid detection device according to the prior art.

Referring to FIG. 12, there is shown a well monitoring configuration according to the prior art. FIG. 12 shows a typical deployment scenario of downhole instrumentation that is required to measure hydrostatic head (pressure) from which a liquid level is determined. A direct liquid level (LL) measurement is not possible using the arrangement shown. The downhole sensor is positioned at a point below the liquid level to ensure that sufficient hydrostatic head is available to provide an accurate reading. The sensor is subject to electronic drift and will need to be replaced if a gauge component fails. The gauge or instrumentation may be suspended from and attached to an I-wire providing a data retrieval path and power supply. Should the I-wire be subjected to damage, the gauge unit will need to be replaced causing a workover. Such in-well instrumentation failures are costly to replace.

Figure 13:
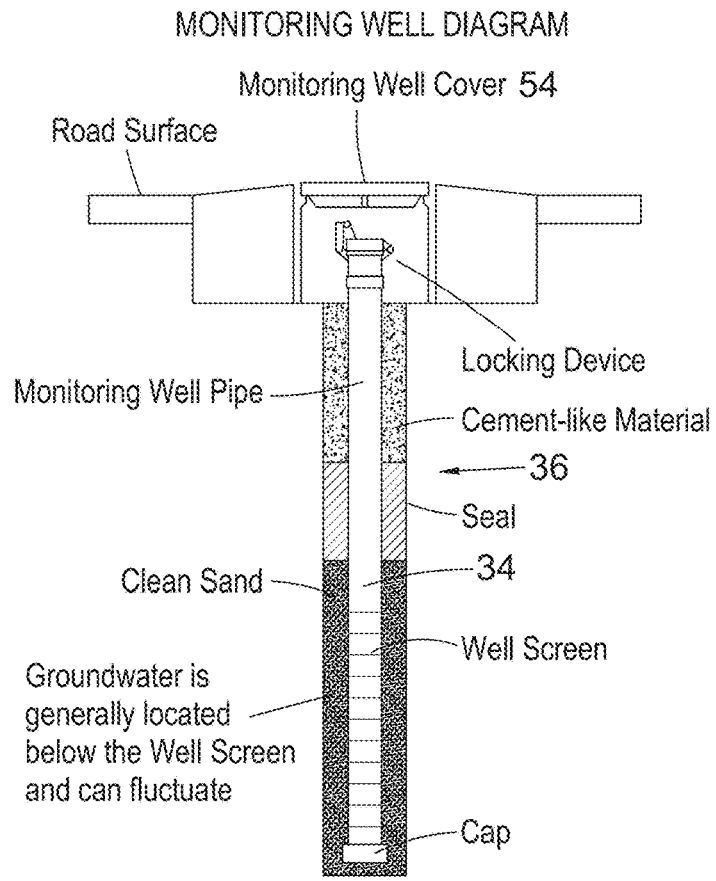
FIG. 13 a schematic diagram of a structure comprising an aquifer well prior to a fluid detection device according to the present invention being provided therein.
Figure 21:
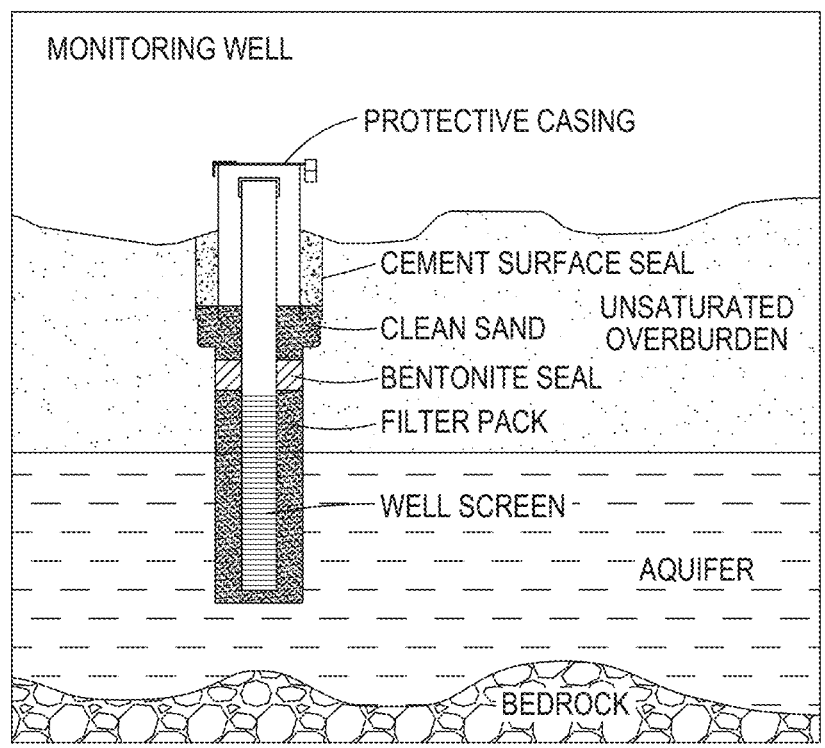
FIG. 21 a schematic diagram of an alternative structure comprising an aquifer well prior to a fluid detection device according to the present invention being provided therein.
Figure 22:
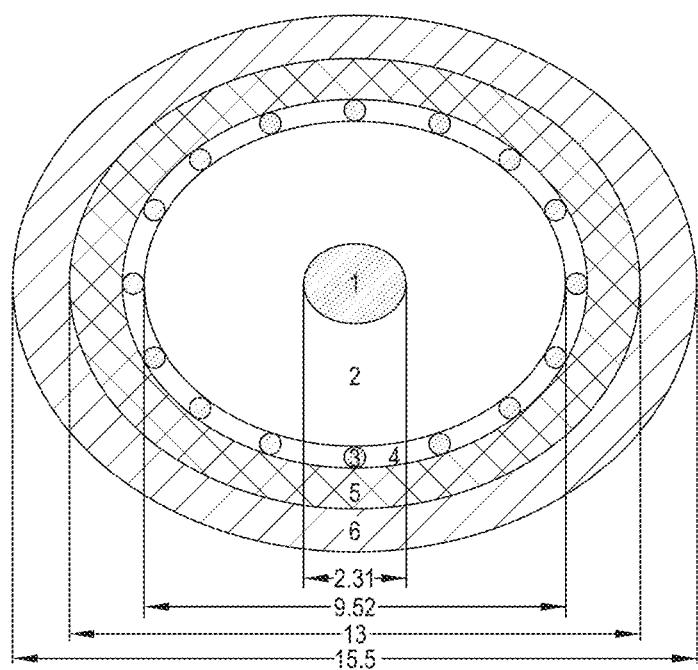
FIG. 22 a cross-sectional view from above of a structure according to the present invention.

Referring to FIG. 13 there is shown an aquifer monitoring well without monitoring instrumentation. (Alternatively, see FIGS. 21 and 22).

In embodiments of the present invention there is provided a radiating cable (RC) or leaky feeder cable (LC) (cable 2). The cable 2 is located into the well, thereby enabling direct liquid level measurements to be obtained without installing gauge instrumentation.

The RC/LC cable 2 is suspended from the surface wellhead 44 into the wellbore 48 or annulus 40 to a depth that will allow a MW signal to propagate along the length of the cable 6 until an impedance reflection or reflections is/are obtained at the surface readout 56, thereby indicating that a fluid/fluid, fluid liquid, liquid/liquid, fluid/gas or a fluid/fluid interface 42 has been detected (see FIG. 13). The reflected MW signals are electronically processed and recorded as a measured liquid level depth. A scanning function can be taken several times a minute continuously for extended periods of time.

The principals of MW reflectometry are discussed in WO2021/048319 (to the present Applicant). The disclosed technique describes the identification and measurement of liquid interfaces in oil, gas and water wells by using MW scans within the well structure. The tubing or casing used to construct the well act as a waveguide. This technique has become established and is accepted as an accurate measurement technology. One matter addressed in WO2021/048319 was that the measurements taken were obtained without any instrumentation or cabling being run into the wellbore or annuli, thereby eliminating well entry risk.

The present invention achieves a similar outcome by an alternative solution, but uses a less costly technique by using low-cost low frequency instrumentation. The RC/CL apparatus 22 is the only hardware placed in the well to allow the subsurface liquid level to be measured. The risk of in-well instrument failure or line breakage has, therefore, been eliminated or reduced. Lower cost objectives are achieved by running a transmission line into the well over a depth range depth that spans/covers the expected fluid level movement ranges and depths.

According to the present invention, the method or technique for liquid level measurements within the main wellbore 48 will provide a means of suspending a length of RC from the surface to extend into the wellbore 48, thus ensuring that the RC is positioned over the depth range of potential liquid level movement. This could be 1,2,3 10, 40 100, 1000, 2000 meters, but not limited in length. The RC can be deployed from a 'continuous reel' or in 'stiff' sections of interconnecting lengths of 1, 2, 3, 5, 10-meter lengths. Further connectors between each length will be suitable for subsurface sealing preventing fluid ingress to the join. The interconnecting lengths of stiff RC can be accurately measured lengths of a material suitable for the well environment and suitable for MW transmissions.

A deployed length of RC can be to cover the measurement interval from the wellhead 44 to interface zone. The RC length deployed to cover the measurement range can be attached to 'normal' coaxial cable 10, that is compatible with the RC, until the required depth is reached/installed. This provides for a measurement range covering the complete well or only the range of interest.

The lower end of the RC apparatus or assembly in the well will be terminated by a matching 'load' and/or termination (end termination 8) that is pressure and fluid tight sealed.

The surface connection will be connected to a suitable MW transceiver (transmitter/receiver 30, 32) and analytical software suite. A typical scan of an RC length is shown in FIG. 3. This shows the connection from the surface readout unit through a 10-meter length of RC with a termination load. The various connectors and end reflection are clearly identifiable with the electrical length matching the physically measured length.

On completion of the installation, the surface scan will provide a readout providing a measurement to the end termination of the RC and also show a single or dual fluid level. The single fluid level will indicate that a gas/liquid interface 42 has been measured and a double peak over a measurement range will indicate a dual interface such as air/oil/water interface.

The RC will be attached to a feedthrough assembly (not shown) at the wellhead 44 that allows the RC to be safely suspended. The surface feedthrough assembly will be capable of pressure containment for a pressure range of 0 psi to 10,000 psi.

Figure 14:
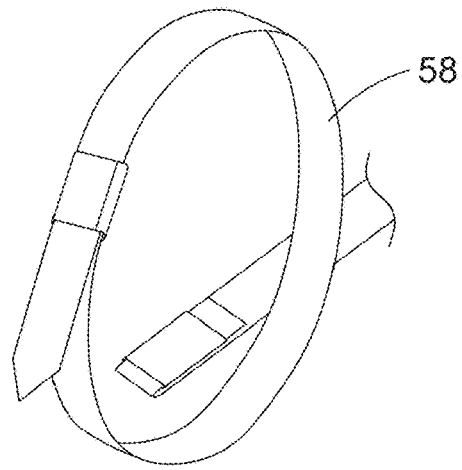
FIG. 14 a ring for use in an embodiment of the present invention.

Over the length of RC deployed markers such as metallic rings or banding straps 58 (see FIG. 14) can be placed around the circumference of the RC to provide fixed marker points. Metallic bands 58 placed around the circumference of the RC cable provides a strong MW reflection.

From the surface readout plots obtained from scanning the RC, the stationary marker points are clearly identifiable from the liquid level reflection.

Figure 15:
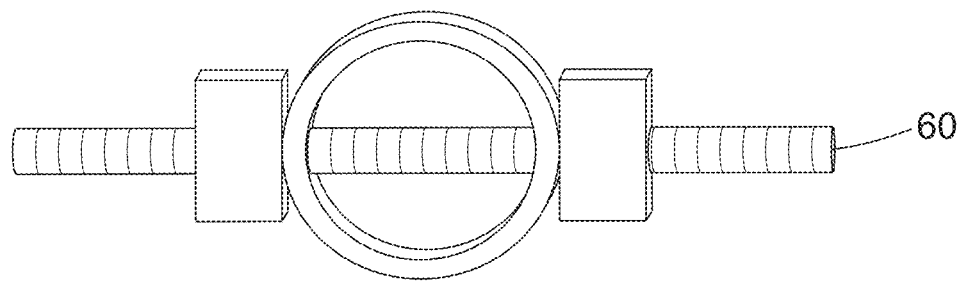
FIG. 15 a centraliser for use in an embodiment of the present invention.

Also attached to the RC, along the deployed length, can be non-metallic centralizers 60 (see FIG. 15) which are spaced as required, and that provide a 'stand-off' from the tubing walls providing a stronger reflection.

Figure 16:
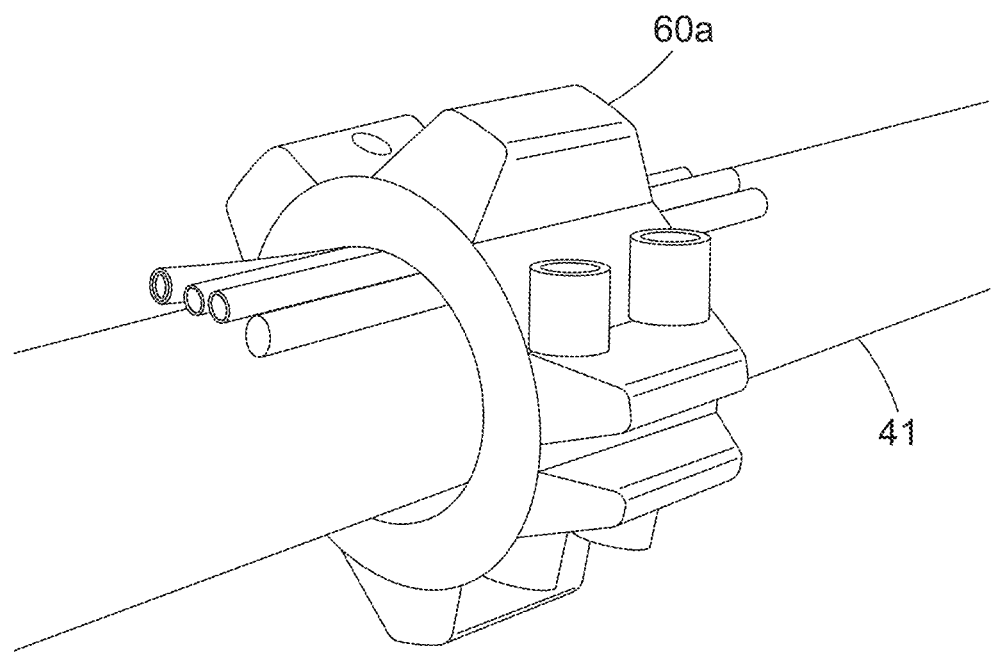
FIG. 16 a cable positioning device for use in an embodiment of the present invention.
Figure 17:
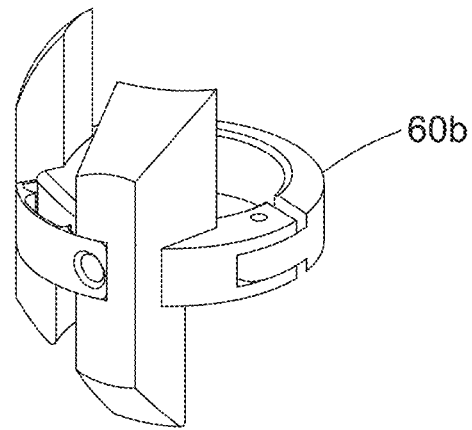
FIG. 17 an alternative cable positioning device for use in an embodiment of the present invention.

Installation of the proposed apparatus 22 or system into an annulus 40 will use a similar technique as described for the tubing deployment. However, the RC and any standard coaxial cable 10 deployed will be supported by other non-metallic centralizers 60a or 60b positioned at strategic points along the tubing length, (See FIG. 16 or 17). Alternatively or additionally, the cable 6 can be secured to tubing 41 by clamps 62 (see FIG. 21).

The surface connection to the RC can be through a tubing hanger and/or through a Christmas tree via a feedthrough or through an annulus wing outlet flange. Annulus liquid level measurement can be for well integrity purposes or for liquid level control for use in artificial lift operations.

A desire for the present invention is to seek to remove or reduce subsurface instrumentation from a well. Such instrumentation or devices are Bottom Hole Gauges (Quartz, Piezo-electric etc.). Embodiments of the present invention inter alia provide:
1. Transmitting MW signals through a radiating cable (RC) to measure liquid level interface(s) in a well conduit or elongate structure.
2. A method of obtaining fluid level measurements using a radiating cable in a tubing string.
3. A method of obtaining fluid level measurements using a radiating cable in an annulus,
4. A method of measuring fluid levels using microwave FDR, TDR or FMCW continuous wave or pulsed system in an oil, gas, water wells.
5. A method of installing fixed positioning markers on a radiating cable to provide wellbore reference points for verifying liquid level measurements.
6. A method of using a radiating cable for measuring single and dual fluid interfaces.
7. A method of using a radiating cable for measuring static and dynamic fluid levels.
8. A means of deploying a radiating cable into a well with a pressure sealing feedthrough.
9. A means of deploying a radiating cable into a well with a unpressurized feedthrough.
10. A method of using a duplex coaxial system, standard coax and radiating cable, to obtain fluid interfaces using MW reflectometry.
11. A means of deploying a radiating cable in a structure to monitor permittivity changes within the structure It will be appreciated that the embodiments of the present invention hereinbefore described are given by way of example only, and are not meant to be limiting of the scope of the invention in any way.

It will be appreciated that an advantage of one or more aspects or one or more embodiments of the present invention is precision of a non-contacting or contactless detection device, apparatus or system, e.g., for measuring a level of a fluid or liquid, or interface, e.g., in a well or borehole.

The following may be pertinent to one or more aspects or embodiments of the present invention:
1. The invention can use FDR, FMCW or Time Domain Reflectometry (TDR)—the results are expected to be more or less the same.
2. Existing software (e.g., Anritsu or Krohne) will not provide the analysis of the signals returned to the surface as the electrical length measurements and hybrid cable assemblies require multiple velocity factors through each component of the cable assembly. This will in-effect not allow accurate and repeatable measurements. In that regard reference is made to WO2021/048319 which discusses modification to include permittivity.
3. The 'stiff' sections mentioned hereinabove can consist of lengths of 'leaky coax' sheathed in a stiff non-metallic tube with matching watertight connectors.
4. The cable 6 can be freely suspended in the well/wellbore from surface or can be run with centalizers to prevent contact with metallic surfaces.
5. The cables 6, 10 can be run into wells/structures with metallic or non-metallic tubing, casing or structure. (For example, measurements related to the 'Angels Share' and Tax Payments for Whisky producers. A section of stiff cable integrated into the 'bung' will provide a means of automated or non-invasive measurement without entry into the barrel).
6. The system described should encompass all usable frequency ranges and bandwidths.

It will be appreciated that while the embodiments of the present invention herein before described primarily illustrate use of the present invention as a fluid (liquid) detection device, the present invention may be used in the detection of gases, colloids, suspensions and/or emulsions and/or of granular and/or particulate materials. Embodiments of the present invention may be used in the detection of any material which may give rise to a change in the dielectric constant of the environment surrounding the cable (antenna).

Embodiments of the present invention may find use in the monitoring of silos, vessels or bulk storage containers, structures or buildings, e.g., for alcoholic beverages, grain, sugar, wheat or molasses or the like.

The invention claimed is:
1. A material level detection device for detecting a material level, the detection device comprising a cable or transmission line comprising a coaxial cable and an electromagnetic transmitter and receiver arrangement connected or connectable to the cable or transmission line;
   wherein
      the cable or transmission line acts as an antenna, and comprises:
         an inner conductor;
         an outer conductor comprising a plurality of apertures or slots provided in a spaced relation along at least part of a length of the outer conductor;
         the inner conductor being provided within the outer conductor;
   wherein
      at least part of the cable or transmission line is configured as at least one of: a radiating cable (RC), a leaky cable, and a hybrid of a leaky cable with a nonleaky cable; and
      the cable or transmission line is configured to propagate an electromagnetic signal from the electromagnetic transmitter and to propagate a reflection or reflections of the electromagnetic signal to the receiver for detecting the material level.
2. A detection device as claimed in claim 1, wherein at least one of:
   at least a portion of the cable or transmission line is not flexible; and
   the cable or transmission line comprises a termination at an end or distal end thereof.
3. A detection device as claimed in claim 1, wherein at least one of:

the cable or transmission line is electrically or electromagnetically connected or connectable to a further cable or transmission line;

the further cable or transmission line comprises a further coaxial cable;

the inner conductor comprises a wire or tube;

the outer conductor comprises at least one of a cylinder; foil and braid;

each of the one or more apertures or slots extends around at least part of a periphery or circumference of the outer conductor;

the one or more apertures or slots comprises a plurality of apertures or slots, and at least some or all of the plurality of apertures or slots are peripherally or circumferentially aligned with one another;

the one or more apertures or slots are linear, curved or spiral in shape;

the one or more apertures or slots act, in use, as the antenna;

the one or more apertures or slots act, in use, as electromagnetic transmitters from and/or receivers to the outer conductor and/or the cable; and the size and/or shape of the one or more apertures or slots predetermine a frequency or frequencies of transmission and/or reception.

4. A detection device as claimed in claim 1, wherein the cable or transmission line comprises at least one of:
a dielectric, which is provided between the inner and outer conductors;
an outer layer or jacket; and
location markers.

5. A detection device as claimed in claim 1, wherein the transmitter and receiver arrangement is connected or connectable to the inner conductor.

6. A material level detection apparatus comprising at least one material level detection device according to claim 1.

7. A detection apparatus according to claim 6, wherein:
the apparatus comprises a further cable or transmission line, wherein at least one of;
the cable is electrically/electromagnetically connected to the further cable;
one end of the further cable is connected to one end of the cable;
the further cable comprises a coaxial or triaxial cable; and
the further cable comprises at least one of:
a further inner conductor;
a further outer conductor;
a further dielectric; and
a further outer layer or jacket.

8. A detection apparatus as claimed in claim 7, wherein the apparatus comprises a transmitter and/or a receiver electrically or electromagnetically connected to the further cable.

9. A detection apparatus as claimed in claim 6, wherein at least one of:
the cable and/or at least part of a further cable are provided within a space; and
the transmitter and/or the receiver are provided external of the space.

10. A structure comprising a space having at least one material detection device according to claim 1.

11. A structure as claimed in claim 10, wherein:
the structure is an enclosed structure;
the device is at least partially or fully provided within the enclosed structure;
the enclosed structure is sealed or unsealed during use of the device;
the enclosed structure is ground, earth, or seabed penetrating;
the enclosed structure is disposed substantially or at least partially vertically; and/or
the space:
comprises an elongate and/or enclosed space;
is selected from one of: a subterranean hole, a borehole, a wellbore, a mineshaft, a vessel and/or a container,
comprises a hydrocarbon well, an aquifer well and/or a water well;
comprises a bore of a production tubing or comprises an annulus between a production tubing and a wellbore casing;
is sealed or unsealed from a surrounding or external environment; and
is pressurized at a pressure above that of a surrounding or external environment.

12. A method of detecting and/or determination and/or measuring and/or monitoring a level and/or position of a material interface within a space, the method comprising:
providing a material detection device according claim 1 within the space or electromagnetically coupled to the space;
transmitting and/or receiving an electromagnetic signal or signals from and/or at/by the material detection device.

13. A method as claimed in claim 12, wherein the method comprises at least one of:
transmitting the electromagnetic signal or signals to the material detection device via a/the further cable; and
receiving the electromagnetic signal or signals from the material detection device via a/the further cable.

14. A method as claimed in claim 12, wherein the space comprises one of an elongate space,
a subterranean hole, a borehole, a wellbore, a mineshaft,
a hydrocarbon well, an aquifer well, a water well,
a bore of a production tubing, an annulus between a production tubing and a wellbore casing.

15. A method as claimed in claim 12, wherein the method comprises the step of sealing and/or pressurizing the space prior to the step of transmitting the electromagnetic signal.

16. A method as claimed in claim 12, wherein at least one of:
the cable and/or the further cable comprise or act as communications conduits;
the space is an elongate space;
the space is a well;
at least a portion of the cable and/or further cable are reelable or spoolable;
the cable and further cable are electrically connected via a connector;
the cable has a substantially circular cross-section;
the further cable has substantially circular cross-section;
in use, the cable is provided downhole, below, and/or further inside the space than the further cable;
in use, the further cable and/or the cable extend substantially from or through a wellhead or Christmas tree;
in use, the cable and/or the further cable are provided in a wellbore of the well;
in use, an electromagnetic signal is propagated within the cable;
in use, a partial reflection of the electromagnetic signal occurs at a/the connector or joint between the cable and the further cable;
the apparatus provides an electromagnetic source;

the electromagnetic source is provided external of the wellhead and/or Christmas tree;

in use, in a transmission path, an electromagnetic signal propagates from the transmitter through the further cable; the further cable extends from the source/antenna (or transmitter) through the wellhead and/or the Christmas tree; in said transmission path, the electromagnetic signal propagates through the connector; in said transmission path the electromagnetic signal propagates through the cable; at fluid/liquid interfaces the electromagnetic signal is at least partially reflected; and the reflected electromagnetic signals propagate through the cable, the connector, and/or the further cable in a received, return, reflected and/or reverse path; the reflected signals being received by the antenna or receiver, and the device and/or apparatus is used to determine a position or depth of a fluid interfaces within a space or a wellbore of the well.

17. A method as claimed in claim 12, wherein at least one of:

the electromagnetic signal comprises a microwave signal, or alternatively a millimeter or radio signal;

the electromagnetic signal has a frequency or frequencies within a range of 1 MHz to 100 Ghz;

the electromagnetic signal comprises a TEM mode;

the electromagnetic signal comprises a guide/waveguide mode; and the method comprises detecting, locating, establishing and/or measuring a fluid level or liquid level and/or interface of a fluid or liquid using a technique comprising: Frequency Domain Reflectometry (FDR), Frequency-Modulated Continuous Wave (FMCW) and/or Frequency-Modulated Interrupted Continuous Wave (FMICW).

18. An elongate and/or enclosed space or enclosed structure, or a subterranean hole or well, comprising a material detection device according to claim 1.

19. A space or structure, or a subterranean hole or well as claimed in claim 18, wherein at least one of:

the well is a production well;

the well is an injection/artificial lift well;

the well comprises a completed/sealed well;

the well comprises a wellbore casing;

the well comprises a production tubing;

the well comprises a wellhead;

the well comprises a Christmas tree;

the well is a disposal well;

the cable extends through a/the wellhead or Christmas tree;

the device extends within the well, within a/the production tubing or in an annulus between a/the wellbore casing and a/the production tubing.

20. A material level detection device for detecting a material level, the detection device comprising a cable or transmission line comprising a coaxial cable and an electromagnetic transmitter and receiver arrangement connected or connectable to the cable or transmission line;

wherein the cable or transmission line acts as an antenna, and comprises:

an inner conductor;

an outer conductor comprising one or more apertures or slots provided along at least part of a length of the outer conductor;

the inner conductor being provided within the outer conductor;

wherein the cable or transmission line is configured as at least one of: a radiating cable (RC), a leaky cable, and a hybrid of a leaky cable with a nonleaky cable; and the transmitter and receiver arrangement is connected or connectable to the inner conductor, wherein the detection device is configured to detect changes of impedance in the vicinity of the cable within a known radiating pattern and strength that will depend upon the frequency and dynamic range of the transmitted signal.

\* \* \* \* \*